United States Patent
Hatano

(10) Patent No.: US 7,346,715 B2
(45) Date of Patent: Mar. 18, 2008

(54) DATA COMMUNICATION CONTROL DEVICE WITH PERIPHERAL DEVICE

(75) Inventor: Naoyuki Hatano, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 421 days.

(21) Appl. No.: 10/662,560

(22) Filed: Sep. 15, 2003

(65) Prior Publication Data

US 2004/0073723 A1    Apr. 15, 2004

(30) Foreign Application Priority Data

Sep. 25, 2002 (JP) ............................. 2002-278273

(51) Int. Cl.
*G06F 3/00* (2006.01)
*G06F 13/12* (2006.01)

(52) U.S. Cl. .................... 710/52; 710/53; 710/54; 710/56; 710/62

(58) Field of Classification Search .............. 710/53, 710/54, 55, 56, 57, 62
See application file for complete search history.

(56) References Cited

U.S. PATENT DOCUMENTS

| | | | |
|---|---|---|---|
| 4,453,229 A * | 6/1984 | Schaire | 710/109 |
| 5,175,819 A * | 12/1992 | Le Ngoc et al. | 710/71 |
| 5,655,138 A | 8/1997 | Kikinis | |
| 5,859,980 A | 1/1999 | Kalkunte | |
| 6,134,665 A * | 10/2000 | Klein et al. | 713/300 |
| 6,640,269 B1 * | 10/2003 | Stewart | 710/52 |
| 6,678,728 B1 * | 1/2004 | Uppunda et al. | 709/222 |
| 6,732,205 B2 * | 5/2004 | Kamihara et al. | 710/71 |
| 6,813,674 B1 * | 11/2004 | Velasco et al. | 710/311 |
| 6,990,676 B1 * | 1/2006 | Proehl et al. | 725/40 |
| 7,007,139 B2 * | 2/2006 | Noyle | 711/154 |
| 2003/0212841 A1 * | 11/2003 | Lin | 710/62 |

FOREIGN PATENT DOCUMENTS

JP    10-145435    5/1998

OTHER PUBLICATIONS www.wikipedia.org, search term="USB"□□.*

* cited by examiner

*Primary Examiner*—Alan S. Chen
(74) *Attorney, Agent, or Firm*—Brinks Hofer Gilson & Lione

(57) ABSTRACT

Loss of data to be transmitted from a peripheral device to a host before a software hierarchy of the host side completely starts is prevented. In a time period before a host completely reached a normal operation mode from a sleep mode, data outputted from a receiver is stored in second buffer memory of a communication control device. When the host reaches the normal operation mode, an application hierarchy in the host transmits a transmission approval command to a control unit, and then the data is transferred from the second buffer memory to first buffer memory. Since communication between the host and the communication control device of the receiver is resumed and then the data stored in the first buffer memory is sent to the host through a USB line, loss of the data can be prevented.

4 Claims, 3 Drawing Sheets

DATA COMMUNICATION CONTROL DEVICE WITH PERIPHERAL DEVICE

BACKGROUND OF THE INVENTION

1. Field of the Invention

The present invention relates to a communication control device for data between a computer and peripheral devices thereof, and more specifically to a communication control device capable of preventing loss of communication data using a USB line.

2. Description of the Related Art

FIG. 5 is a conceptual view illustrating a conventional data communication method, and shows communication control between a host computer (hereinafter, referred to as "host") 1 and a peripheral device 2.

The host 1 and the peripheral device 2 are connected through a universal serial bus ("USB") line 3, and data communication therebetween using digital signals can be performed.

Storage means 2a is provided in the peripheral device 2, and the data generated by the peripheral device 2 is stored in the storage means 2a.

When the data generated by the peripheral device 2 is stored in the storage means 2a, the peripheral device 2 transmits the data from the storage means 2a to the host 1 in response to a data transmission request signal ("IN command") from the host 1. On the other hand, when the data is not stored in the storage means 2a, the peripheral device 2 sends a negative acknowledge ("NAK") signal indicative of absence of data to the host 1.

In this manner, the host 1 transmits the data transmission request signal to the peripheral device 2 for every predetermined period of time, and the peripheral device 2 transmits the NAK signal or the data to the host in response to the data transmission request signal, so that interactive data communication between the host 1 and the peripheral device 2 is performed.

(Patent Document 1)

Japanese Unexamined Patent Application Publication No. 10-145435.

However, even when a software hierarchy of the host 1 for accepting the data is not prepared completely, a hardware hierarchy of the host 1 may output the data transmission request signal to the peripheral device 2. At that time, if the data is not stored in the storage means 2a of the peripheral device 2, the data is sent from the peripheral device 2 to the host 1, and as a result, a problem occurs in which the host 1 may lose the data.

In particular, right after the host 1 is powered on or when the host 1 is being restored from a sleep mode or a suspended mode, etc. by means of a resume function, the peripheral device 2 may send the data stored in the storage means 2a to the host 1. Then, since the data is transmitted from the peripheral device 2 to the host 1 before the software hierarchy reaches a normal operation mode, the aforementioned phenomenon can easily occur.

Such phenomenon is apt to take place in case, for example, wherein a hard disk in the host 1 is a digital video device for recording television broadcasting, etc. That is, when a person watches the television broadcasting in a state that the host 1 is in the sleep mode and the like, he/she may intend to record the broadcasting in the hard disk of the host 1. Then, even if a resume signal is transmitted from an input device (peripheral device) such as a keyboard or a remote control (not shown) to the host 1, it is usual that one minute or more is taken till the host 1 is restored and then the data communication between the input device and the host 1 is switched into the normal operation mode.

For this reason, when data required for video recording such as recording start data (REC data) or channel data of the television broadcasting is inputted to the input device, the storage means 2a in the input device stores the data. However, if the hardware hierarchy outputs the data transmission request signal to the input device before the software hierarchy of the host 1 starts, the data required for video recording may be lost. As a result, a problem may occur wherein the video recording does not start even after the host 1 is restored or a problem of other channel being recorded may occur.

With regard to such problems, even when the peripheral device 2 receives the data transmission request signal, a constitution wherein the NAK signal is continuously transmitted for a certain period of time until the software hierarchy completely starts after outputting resume signals, but data is not transmitted may be considered desirable.

However, since the time required for the host 1 in receipt of the resume signal to reach the normal operation mode depends upon environment such as the hardware constituting the host 1 or the operating system built in the host 1, it is difficult to determine a certain period of time during which the NAK signal is continuously transmitted. Thus, such constitution may not be considered proper/suitable.

SUMMARY OF THE INVENTION

The present invention has been achieved in order to solve the above problems. It is therefore an object of the present invention to provide a communication control device capable of preventing loss of data in data communication between a host computer and a peripheral device.

The present invention provides a communication control device for controlling data communication between a host computer and a peripheral device, the communication control device comprising: first storage means for storing data to be sent to the host computer; second storage means for storing data outputted from the peripheral device; and a control unit for transferring the data stored in the second storage means to the first storage means, when receiving a transmission approval command of approving data transmission from the peripheral device to the host computer.

According to such invention, the data inputted to the peripheral device after the resume signal is issued is temporarily stored in the second storage means of the communication control device. Then, after the host starts from the sleep mode and the software hierarchy reaches the normal operation mode to enable the communication between the host and the peripheral device, the data can be transmitted from the communication control device to the host, thereby surely preventing loss of data.

Here, it is preferable that the first storage means and the second storage means be a FIFO buffer. In particular, it is preferable that the second storage means be a multi-stage FIFO buffer.

In the above configuration, since the data is outputted in the order thereof that is recorded in the buffer, it becomes easier to handle data. In addition, it is possible to store much more data.

Furthermore, in this case, the data communication can be performed using a USB line.

However, the present invention is not limited only to the USB line.

DESCRIPTION OF THE PREFERRED EMBODIMENTS

Figure 1:
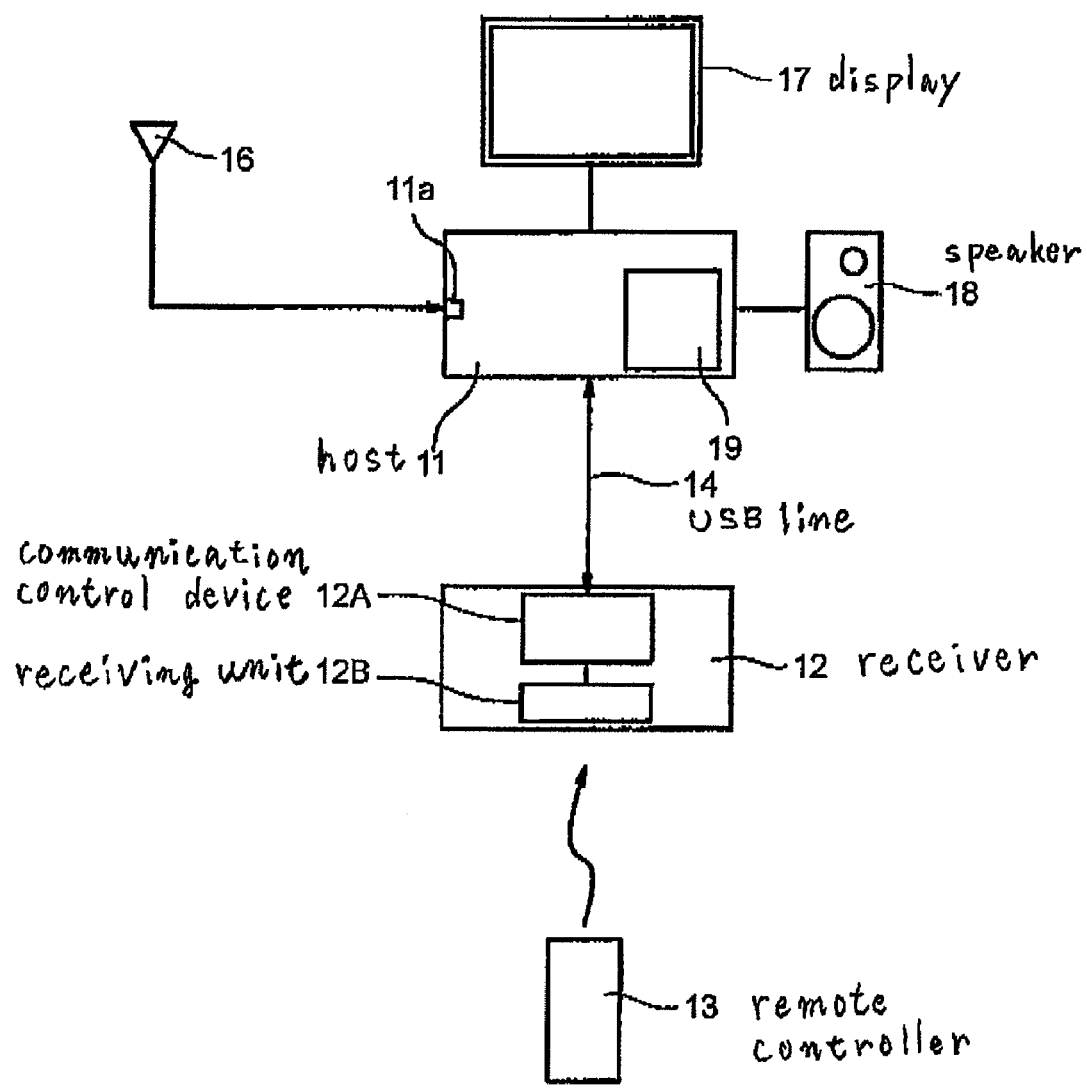
FIG. 1 is a conceptual view illustrating a system configuration in which a host computer is combined with a peripheral device equipped with a communication control device as an embodiment of the present invention.
Figure 2:
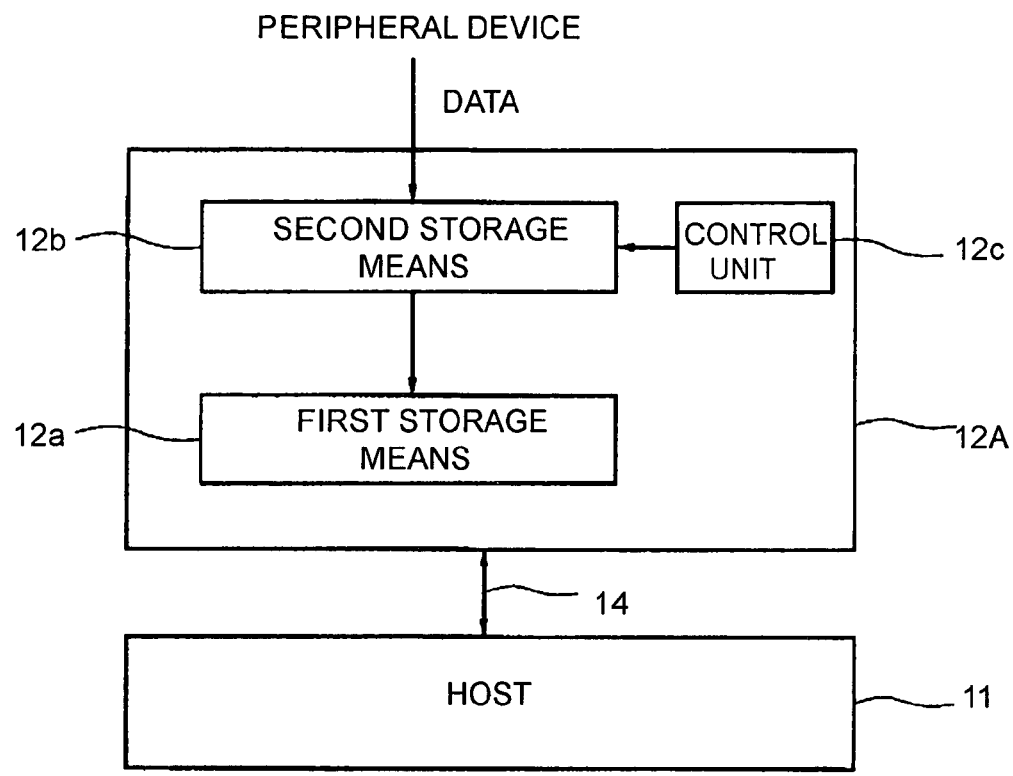
FIG. 2 is a block diagram illustrating a communication control device according the present invention.
Figure 3:
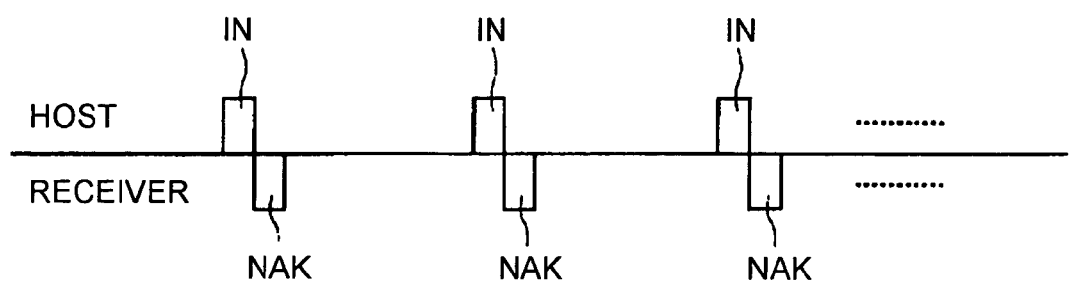
FIG. 3 is a timing chart illustrating communication timing between a host and a receiver in a low power consumption mode.
Figure 4:
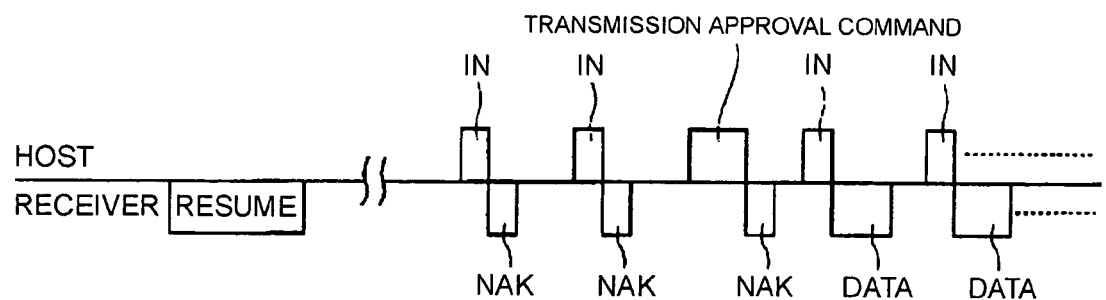
FIG. 4 is a timing chart illustrating communication timing between the host and the receiver while the host is switched from a sleep mode to a normal operation mode.
Figure 5:
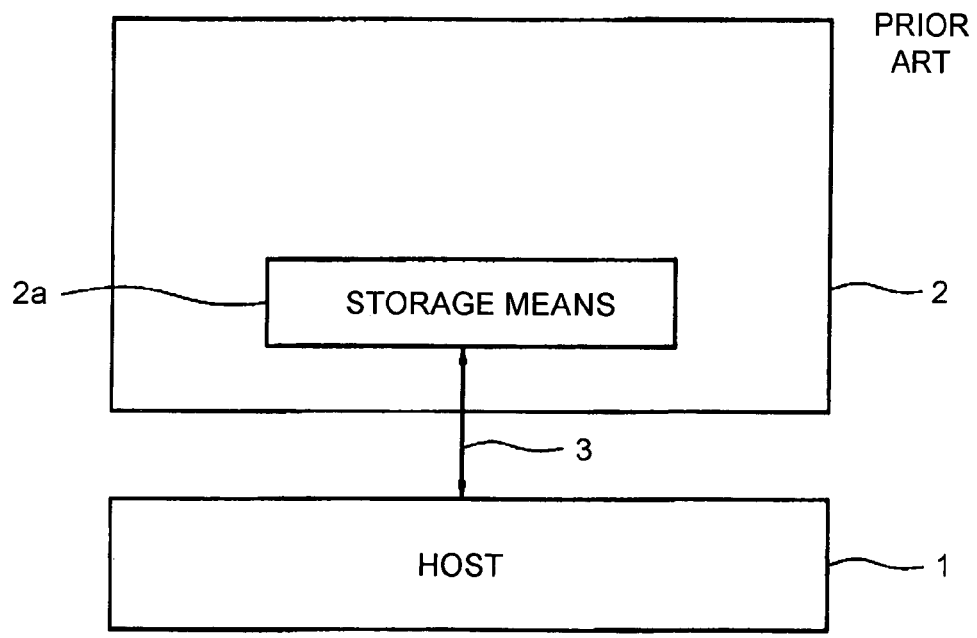
FIG. 5 is a conceptual view illustrating a conventional data communication method.

FIG. 1 is a conceptual view illustrating a system configuration in which a host computer is combined with a peripheral device equipped with a communication control device as an embodiment of the present invention, FIG. 2 is a block diagram illustrating a communication control device according to the present invention, FIG. 3 is a timing chart illustrating communication timing between a host in a low power consumption mode and a receiver, FIG. 4 is a timing chart illustrating communication timing between the host and the receiver while the host is switched from a sleep mode to a normal operation mode.

In the embodiment shown in FIG. 1, a remote control 13 as an input device and a receiver (peripheral device) 12 are provided around a host (host computer) 11.

The remote control 13 outputs data required for remotely controlling a recording function of the host 11, using radio wave, infrared ray and the like. The remote control 13 is provided with a variety of manipulation switches such as a start switch (power-on switch), a power-off switch, a sleep mode switch, a playback switch, a video recording switch, a stop switch, a time setting switch, a channel selection switch, and the like. The data is outputted while it is digitally encoded.

As shown in FIG. 1, the receiver (peripheral device) 12 is provided with a receiving unit 12B for receiving the radio wave or the infrared ray outputted from the remote control and a communication control device 12A. The communication control device 12A performs communication control of a USB line 14, which connects the host 11 to the receiver 12, and processing data received by the receiving unit 12B.

As shown in FIG. 2, the communication control device 12A is provided with first storage means 12a, second storage means 12b and a control unit 12c.

The first storage means 12a comprises a FIFO (First In First Out) buffer. The second storage means 12b stores the data transmitted from the remote control 13 and received by the receiving unit 12B. The second storage means 12b may comprise a FIFO buffer similar to the first storage means 12a and may be physically constructed as one region in a RAM (Random Access Memory). However, it is preferable that the RAM be physically divided into a plurality of regions to construct the second storage means as a multi-stage FIFO buffer. In this regard, much more manipulation data can be stored.

The first storage means 12a and the second storage means 12b are operated to first output the data first stored in the FIFO buffer. Further, when the second storage means 12b is the multi-stage FIFO buffer, the data to be sent from the receiving unit 12B is sequentially shifted from an upstream FIFO buffer to a downstream FIFO buffer.

Furthermore, the control unit 12c comprises a USB controller and a one-chip microcomputer, etc.

As shown in FIG. 1, the host 11 is provided with a receiving input terminal 11a, and an image data or a sound data such as television broadcasting from the receiving unit 16 such as an external antenna is always inputted to the host 11 through the input terminal 11a. Then, the image of the television broadcasting can be displayed and the sound can be outputted using a display 17 and a speaker 18 connected to the host 11. In addition, a hard disk drive 19 is provided in the host 11, and image data or sound data can be recorded in the hard disk drive ("HDD") 19 as needed. Furthermore, the image data or the sound data recorded in the hard disk drive 19 can be played back through the display 17 and the speaker 18 at any time.

Now, the operation of the present invention will be described.

If the sleep mode switch of the remote control 13 is manipulated, the host 11 is set to a low power consumption mode such as a sleep mode or a suspended mode.

In the low power consumption mode, since the display 17, the hard disk drive 19 and the like are in a 'stop' state, the image data or the sound data of the television broadcasting cannot be recorded.

When the host 11 is in the low power consumption mode and if the start switch of the remote control 13 is manipulated, the manipulation data (start data) is transmitted to the receiver 12. If the receiver 12 receives the start data, the receiver 12 generates a resume signal to output it to the host 11 through a USB line 14.

As shown in FIG. 3, the host 11 transmits a data transmission request signal IN to the receiver 12 for a constant period of time. On the contrary, the receiver 12 normally sends back an NAK signal indicative of absence of data in the first storage means 12a to the host 11 in synchronism with the data transmission request signal IN. Therefore, the USB line 14 between the host 11 and the receiver 12 is secured to be in a communication enabled state.

In the low power consumption mode, the control unit 12c determines whether a start data indicative of manipulation of the start switch is transmitted from the remote control 13. Then, when the start data has not been transmitted, the control unit 12c controls so that such data is not stored in the second storage means 12b even if a manipulation data of a switch except for the start switch is transmitted from the remote control 13. In this regard, it is possible to neglect all the manipulation data before the start switch is manipulated, and to validate only the new manipulation data after the start switch is manipulated. Therefore, since the unnecessary manipulation data is not outputted from the receiver 12 to the host 11, the erroneous operation of the host 11 due to such unnecessary manipulation data can be prevented.

Next, in the low power consumption mode, when the start switch of the remote control 13 is manipulated, the control unit 12c determines that the start data has been transmitted from the remote control 13 to the receiver 12. Then, the control unit 12c stores the start data received by the receiving unit 12B in the second storage means 12b. Further, the control unit 12c transfers the start data to the first storage means 12a while generating the resume signal to send it to the host 11 through the USB line 14.

Subsequently, when any manipulation switch other than the remote control 13, for example, a manipulation switch (REC switch), etc. commanding recording of image or sound is manipulated and the manipulation data thereof is transmitted to the receiver 12, the control unit 12c stores the manipulation data received by the receiving unit 12B in the second storage means 12b.

As shown in FIG. 4, when the resume signal is outputted from the peripheral device to the host 11 in the low power consumption mode, the host 11 is automatically restored to a normal power mode, an image can be displayed in the display 17, and the hard disk drive 19 can be operated. At the same time, the host 11 starts software hierarchies such as an operating hierarchy, a driver hierarchy and an application hierarchy.

Then, when the host 11 completely starts all the software hierarchies, the application hierarchy transmits a transmission approval command to the control unit 12c of the communication control device 12A in the receiver 12 through the USB line 14.

When the control unit 12c of the receiver 12 receives the transmission approval command, the control unit 12c transfers the manipulation data stored in the second storage means 12b to the first storage means 12a. Further, when the manipulation data exists in the first storage means 12a, the control unit 12c transmits the manipulation data stored in the first storage means 12a to the host 11 through the USB line 14 in response to the data transmission request signal IN from the host 11. Furthermore, when the manipulation data does not exist in the first storage means 12a, the control unit 12c transmits the NAK signal in response to the data transmission request signal from the host 11.

The communication according to the specification of the USB line 14 is performed between the host 11 and the first storage means 12a of the communication control device 12A of the receiver 12. After the application hierarchy of the host 11 reaches the normal operation mode, the manipulation data of the remote control 13 required by the software hierarchy of the host 11 can be received in accordance with the specification of the USB line 14 by controlling the control unit 12c in response to the transmission approval command outputted from the host 11 to transfer the manipulation data from the second storage means 12b to the first storage means 12a.

Furthermore, since the manipulation data of other switches manipulated after the manipulation of the start switch of the remote control 13 can be stored in the second storage means 12b of the receiver 12 until the software hierarchy of the host 11 completely starts and the communication of the USB line 14 is restored to the normal operation mode, the loss of the manipulation data can be prevented.

That is, even if other manipulation switches are manipulated successively after the manipulation of the start switch of the remote control 13, the manipulation data thereof is surely transmitted to the host 11. Accordingly, it is not necessary to manipulate the manipulation switches again after the host 11 is started.

Then, in accordance with other manipulation switches manipulated successively after the manipulation of the start switch of the remote control 13, the channel of the television broadcasting is set, and the image data or sound data is recorded in the hard disk drive 19.

Furthermore, when the application hierarchy of the host 11 starts, the transmission approval command is transmitted to the receiver, and thus data can be transmitted. Therefore, even when the time in which the host 11 reaches from the low power consumption mode to the normal operation mode varies for each host 11 due to influence of the hardware or the software, the stored data is transmitted right after the software hierarchy starts.

Furthermore, although the above embodiment has been described that the communication control device 12A is provided in the receiver 12 as a peripheral device and the host 11 is set up by means of the remote control 13, the present invention is not limited thereto, but the present invention may be constructed such that other input means such as a keyboard is connected to the host 11 through the USB line 14, and the host 11 starts directly by means of the manipulation of the input means. In this regard, the input means such as keyboard is employed as a peripheral device of the host 11.

Further, although the USB line 14 has been described as the communication line between the host 11 and the peripheral device, other communication lines may be used.

As described above, according to the present invention, even if the data transmission request signal is transmitted from the hardware hierarchy to the peripheral device when the software hierarchy has not yet been prepared for reception of data, it is possible to prevent the loss of data.

In particular, even when the data generated from the peripheral device is transmitted to the host through the USB line during an unstable period of time in which the host in receipt of the resume signal reaches the normal operation mode, it is possible to prevent the loss of data.

What is claimed is:

1. A communication control device that controls data communication between a host computer and a peripheral device, comprising:
    first buffer memory that stores data to be sent to the host computer;
    second buffer memory that stores data outputted from the peripheral device; and
    a control unit that is operable to generate a resume signal that is output from the peripheral device to the host, which is operable to generate a transmission approval command that is transferred to the peripheral device,
    wherein the control unit is operable to transfer the data stored in the second buffer memory to the first buffer memory after receiving the transmission approval command from the host approving data transmission from the peripheral device to the host computer,
    wherein the control unit is operable to transmit data from the first buffer memory to the host computer only after the transmission approval command is received from the host in response to the resume signal,
    wherein the first buffer memory and the second buffer memory are FIFO buffers.

2. The communication control device according to claim 1, wherein the second buffer memory is a multi-stage FIFO buffer.

3. The communication control device according to claim 1, wherein the data communication is performed using a USB line.

4. The communication control device according to claim 1, wherein the peripheral device includes the first buffer memory and the second buffer memory.

* * * * *